United States Patent Office 3,485,786
Patented Dec. 23, 1969

3,485,786
ANTISTATIC POLYOLEFINS
Konrad Rombusch, 193 Lipper Weg, 4370 Marl, Germany, and Ursula Eichers, 29 Limperstrasse, 4350 Recklinghausen, Germany
No Drawing. Filed Feb. 8, 1966, Ser. No. 525,852
Claims priority, application Germany, Feb. 13, 1965, 1,228,056
Int. Cl. C08f 29/02, 45/44
U.S. Cl. 260—80.78                     13 Claims

ABSTRACT OF THE DISCLOSURE

Polyolefins such as polyethylene and polypropylene having incorporated therein as antistatic agents hydroxyethylated or hydroxypropylated alkoxy propylamines such as n-dodecyloxypropyl - N - hydroxyethyl-N-hydroxyethylamine.

---

The present invention relates generally to a process of treating polyolefin resins to minimize or eliminate the accumulation of electrostatic charges.

It is known that plastic articles, in particular those made of polyolefins, can be rendered antistatic by treating the external surface thereof with an antistatic agent. The protection against the accumulation of electrostatic charges obtained in this manner lasts only until the applied thin layer of the antistatic agent is worn or peeled off. Therefore, it is preferred to incorporate into and as an integral part of the polyolefin compositions, before they are molded, suitable additives, such as hydroxyethylates of alkanols and alkylaryl phenols (Belgian Patent No. 536,623 and British Patent No. 731,728, respectively).

When these conventional antistatic agents are incorporated into polyolefins in amounts sufficient to obtain the desired destaticizing effect, the resultant protection turns out to be only temporary since the agent tends to sweat or seep out of the substrate in an undesired manner. A more satisfactory reduction in the static propensity of polyolefins can be obtained with hydroxy-ethylates of alkylamines and fatty acid amides (Belgian Patent No. 645,-800 and French Patent No. 1,322,626, respectively). To effectively destaticize polyolefins, particularly articles molded from highly crystalline and/or highly isotactic polyolefins, it is necessary to use relatively large amounts of antistats which will begin to seep to the surface of the article in the form of an oily layer after relatively short residence periods. Moreover, the ubiquitous distribution of relatively high concentrations of the antistat in the resin very often deleteriously affects the mechanical behavior of the resultant composition during subsequent shaping and forming operations thereof. For this reason, it is desirable to incorporate into polyolefins an antistat which effectively eliminates the accumulation of electrostatic charges without deleteriously impairing the physical properties thereof.

It is therefore a principal object of this invention to provide an improved treatment of polyolefins to prevent the accumulation of static electricity thereon.

It is another object of this invention to provide an improved treatment of polyolefins which will impart permanent antistatic protection thereto.

It is yet another object of this invention to provide a method of imparting improved antistatic protection to polyolefins with an antistat which can be used in relatively low concentrations therein.

It is still another object of this invention to provide for polyolefins a new class of antistatic agents which will not deleteriously affect the physical properties thereof.

It is another object of this invention to provide for polyolefin materials a class of antistatic agents which will not seep or sweat out of the material and which will remain in an active and effective state over long periods of time.

These and other objects and advantages of the invention will become apparent by reference to the following description and claims appended hereto.

It has been surprisingly discovered that polyolefins masses can be endowed with excellent antistatic properties by incorporating therein from 0.01 to 4% by weight of N-hydroxyalkylates (aliphatic alcohols) of alkoxypropylamines of the formula:

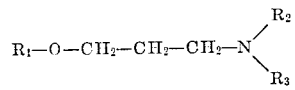

wherein, $R_1$ represents an alkyl, alkenyl, alkylcycloalkyl, aryl, alkylaryl, or alkenylaryl group of 6–25 preferably 8 to 18 chain carbon atoms in the alkyl or alkenyl moiety and 4 to 18, preferably 6 to 12 carbon atoms in the cycloalkyl, the aromatic moiety of the aryl, alkylaryl, and alkenylaryl radical having 1 to 3 preferably 1 to 2 rings containing 0 to 4 preferably 0 to 2 carbon atoms coupled by fused rings.

$R_2$ and $R_3$ represent a residue $(C_xH_{2x}O)_nH$, $x$ being 2 or 3, and $n$ being 1 to 10, preferably 1 to 3, wherein $R_3$ can also represent a hydrogen atom.

These compounds can be used by themselves or in mixture with other antistatically effective compounds.

It is preferable to employ as $R_1$ a saturated or unsaturated straight-chain or branched alkyl, alkylcycloalkyl or alkylaryl group of 6–25, preferably 8–14 carbon atoms in the alkyl, or aryl group. Suitable as the $R_1$ are, for example, the following residues: hexyl, n-octyl, ethylhexyl, n-nonyl, i-nonyl, n-dodecyl, n-tetradecyl, i-tetradecyl, hexadecyl, oleyl, n-octadecyl, nonylcyclohexyl i-nonylphenyl, n-dodecylphenyl, i-dodecylphenyl, n-octadecylphenyl, or mixtures of these residues, such as a mixture of $C_{12}$–$C_{18}$-fatty alcohols; more preferred residues are 2-ethylhexyl, decyl, undecyl, n-dodecyl, tridecyl, and tetradecyl.

$R_2$ and $R_3$ can be identical or different $(C_xH_{2x}O)_nH$ groups, i.e., ethyl alcohol, propyl alcohol, polyethylene glycol or polypropylene glycol residues wherein $x$ has the value of 2 or 3, and $n$ has the value of from 1 to 10, preferably 1 to 3. $R_3$ can also represent hydrogen when $R_2$ is any of these other residues.

Suitable of the above-described antistatic agents are, for example, the addition products of 2 mols ethylene oxide to 1 mol n-hexyloxypropylamine, of 1 mol propylene oxide to 1 mol 2-ethylbutyloxpropylamine, of 20 mols ethylene oxide to 1 mol n-decyloxypropylamine, of 6 mols ethylene oxide to 1 mol pentacosyloxypropylamine, of 13 mols oleylcyclohexylpropylamine, of 20 mols propylene oxide to 1 mol tetradecyloxypropylamine, of 1 mol ethylene oxide to 1 mol of a mixture of isomeric branched dodecyloxypropylamines, of 8 mols ethylene oxide to 1 mol of a mixture of isomeric branched trimethylhexyloxypropylamines, of 2 mols ethylene oxide to 1 mol stearic alkyloxypropylamine, of 12 mols propylene oxide to 1 mol coconut oil alkyloxpropylamine, of 5 mols ethylene oxide to 1 mol of a mixture of $C_{19}$-$C_{25}$-alkyloxypropylamines, and of 2 mols ethylene oxide to 1 mol of a mixture of oleyl and stearyl oxypropylamines.

The alkoxypropylamines are obtained, for example, by the addition of alcohols, such as, for example, alkanols, alkenols and alkylphenols to acrylonitrile, followed by hydrogenation of the cyano group to the amine. The resulting alkoxy propylamines can then be reacted with alkylene oxide to form the aliphatic alcohol derivatives thereof as exemplified by the substituents $R_2$ and $R_3$. When the latter reaction is carried out with 2 mols of the alkylene oxide, per 1 mol of alkoxypropylamine in the absence of a catalyst, there is obtained, for example, the di-hydroxyethyl derivative. However, in the presence of catalytic amounts of alkali, for example in the form of sodium hydroxide, the alkoxypropylamines react with from 1 to about 500 units of ethylene oxide and consequently the molecular weight of the glycol residue is increased.

Generally, more effective destatization is achieved with agents having a narrower molecular weight distribution which is dependent, in large part, on the chain length of the aliphatic alcohol residue. One method of controlling the aliphatic alcohol residue chain length to obtain agents having a narrower molecular weight distribution is to catalytically react ethylene-oxide with the dihydroxyethyl derivatives previously produced without a catalyst. The amount of alkali catalyst needed per mol of alkoxypropylamine to increase the chain length of the aliphatic is preferably from 0.0001 to 0.01 mols of an alkali selected from the group consisting of sodium hydroxide and potassium hydroxide.

This above-described methods of preparing the antistatic compounds of the invention do not always produce only one lone species thereof, but instead, there is often obtained a mixture of homologs. These homologs differ with respect to the number of carbon atoms in the various alkyl groups, as well as the number of repeating aliphatic alcohol residues. In terms of protection afforded against the accumulation of static electricity, these chemical differences are normally of little importance, particularly when the molecular weight distribution is within a narrow range.

Satisfactory destatization of polyolefins is also achieved with various of the compounds embraced by Formula 1 wherein the substituents $R_2$ and $R_3$ are different from each other. Such compounds are obtained, for example, by substituting a first hydroxyalkyl group for only one hydrogen atom of the amino group and reacting the thus-obtained compound with a second and different aliphatic alcohol. For example, when the first hydroxyalkyl is hydroxyethyl and the second is hydroxypropyl there is obtained alkoxypropyl - N - hydroxyethyl-N-hydroxypropylamine.

It is also desirable to employ a mixture of different species of these new antistatic agents. In fact, effective destatization of olefins is obtained when one or several of the substituents $R_1$, $R_2$ or $R_3$ differ.

The foregoing antistatic additives are added to a polymer of olefins having 2–8 carbon atoms, for example, high-pressure and low-pressure polymers of ethylene, propylene, butene-(1), pentene-(1), 4-methyl-pentene-(1), or octene-(1), or other mono-α-ethylenically unsaturated hydrocarbons.

In particular the invention is useful with polyethylenes having molecular weights between 10,000 and 1,000,000, preferably between 40,000 and 200,000 polypropylenes having molecular weights between 50,000 and 800,000, preferably between 200,000 and 500,000, polybutenes-(1) having molecular weights between 200,000 and 5,000,000, preferably between 500,000 and 3,000,000, poly-4-methyl-pentenes-(1), having molecular weights between 200,000 and 2,000,000, preferably between 300,000 and 1,000,000, and copolymers and polymer mixtures thereof.

The antistatic agent is desirably added to copolymers of polyolefins comprising: ethylene-propylene; ethylene-butylene; propylene-butylene; ethylene-propylene-butylene. Each of these components can be present in the copolymers in an amount up to 99.9% by weight.

Mixtures of the foregoing olefin polymers to which the antistatic agent is desirably added include for instance:

polyethylene+polypropylene; polyethylene+polybutylene;
polyethylene+polypropylene+polybutylene;
polyethylene+polyisobutylene;
polyethylene+ethylene-butylene-copolymer;
ethylene-propylene-copolymer+propylene-ethylene-copolymer;
polyethylene+polypropylene+ethylene-butylene-copolymer.

Each of these components can be present in the copolymers in an amount up to 99.9% by weight.

The antistatic agents of this invention can be incorporated into polyolefins in various ways. For example, the antistatic agent can be added to polyolefin particles and the resulting material mixed to form a homogeneous mass. For this purpose, generally any commercially available high-speed mixer is suitable. The polyolefin can also be mixed first with a greater amount of the antistatic agent than desired and the composition of this mixture subsequently adjusted by the admixture of additional polyolefin therewith. It is also possible to incorporate the antistatic agent into the polyethylene directly on the mill or, for example in case of injection molding, in an extruder. It is also desirable to mix the antistatic agent dissolved, dispersed, suspended, or emulsified in a suitable organic solvent with polyethylene powder. Thereafter, the solvent can be removed, for example, by heating the polymer to vaporize the solvent. A solvent well suited for these purposes is, for example, methanol, ethanol, dioxane, acetone, water and aqueous solutions of such organic solvents.

However, all other easily distillable solvents are suitable for this purpose.

Advantageously, other conventional agents used in polyolefins such as for example pigments, coloring materials, stabilizers, mold release agents, plasticizers and fillers, can be added to the polyolefins with the antistatic agent. If desired, one or more conventional antistatic agents can be employed together with the novel antistat of this invention.

Alternatively, finished molded articles can be destaticized with a solution of the antistatic agents applied by immersing, by spraying, or by transfer from a wiping cloth. For this purpose, suitable are, for example, 0.5 to 10% solutions in water or suitable organic solvents, such as methanol.

Although a finite quantity of the antistatic agent of this invention provides a finite reduction in the accumulation of static electricity in polyolefins, the antistatic agent desirably constitutes 0.1 to 4.0% by weight, preferably 0.3 to 1.5% by weight of the polyolefin. Polyolefin articles thus prepared, and particularly those used in the household or in warm dry air, are provided with protection against the deposit of dust due to electrostatic charges on the surface of the article. Generally, the protection against electrostatic charging decreases with decreasing concentrations of the antistatic agent and when the concentration is below 0.05%, the antistatic protection may not completely prevent the deposition of dust on the surface of the polyolefin article. On the other hand, concentrations of the agent higher than 4% generally afford little improvement in the antistatic protection over and above the effective destaticization provided by using from 0.1 to 4% by weight of the antistat.

Polyolefins containing these antistatic agents can be utilized in the production of articles by any of the conventional shaping methods. For example, a polyolefin containing the antistatic agent can be formed into foils by blowing or rolling, fibers by drawing, or other articles shaped by injection molding process or by press molding.

Molded polyolefin articles treated with the antistatic agents of this invention unexpectedly exhibit up to and including a tenfold improvement in the surface resistance values, e.g., lower by up to a complete power of ten, over the prior art, hydroxyethylated alkylamines and fatty acid amides. In view of the higher potency and effectiveness of the present antistatic agents in comparison to conventional antistats, satisfactory destaticization of polyolefins can now be attained with significantly smaller amounts of the agent. In addition to the economy afforded by the use of smaller amounts of the present agent, the disadvantages normally attendant the use of the conventional agents, i.e., migration or sweating of the agent, and the impairment of the mechanical properties and processability of the molded masses, are eliminated. A further advantage of incorporating the agents of this invention in polyolefins is that the longevity of the antistatic protection is extended and is more permanent than heretofore obtainable with the prior art agents.

To determine the antistatic effect of the present agents on polyolefin articles containing the same, the surface resistance thereof is measured at 22° C. and 40% relative humidity after the surface of the article has been charged by vigorously rubbing its surface ten times with a dry wool cloth. The surface of the resulting charged article is then positioned a distance of 1 cm. directly over finely powdered cigarette ashes to determine whether the magnitude of the charge on the surface is sufficient to attract the ashes. The test is labeled positive if the molded body does not attract any ash particles.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever. In the following examples, the amount of alkoxypropylamine, where not specified, is 1 g.-mol.

EXAMPLE 1

200 g. of the addition product of n-dodecyloxypropylamine and 3 g.-mols ethylene oxide are dissolved in 2 liters of methanol. To the resulting solution is added 10 kg. of polyethylene while stirring, and the methanol solvent is then removed by evaporation. From the remaining mixture, both pressed and injection molded plates are produced, and the antistatic effectiveness thereof is tested as described above. Even after vigorously rubbing the surface of these plates ten times with a wool cloth, they do not attract dust, while similar plates of pure polyethylene strongly attract dust.

EXAMPLE 2

150 g. of the addition product of octadecyloxypropylamine and 15 g.-mols ethylene oxide are mixed in a high-speed blender with 10 kg. of polypropylene. After the resulting mixture is granulated and both pressed and injection molded parts are produced therefrom, the effect of the antistat is tested. After rubbing with a wool cloth, the plates and molded parts do not attract any dust.

EXAMPLE 3

100 g. of the addition product of ethylbutyloxypropylamine and 4 g.-mols ethylene oxide are mixed in a high-speed blender with 10 kg. of polybutene-(1); pressed and injection molded plates are produced from the resulting mixture. After these plates were rubbed with a wool cloth to gauge their static propensity, they do not attract any dust.

EXAMPLE 4

200 g. of the addition product of 12 g.-mols ethyleneoxide and nonylphenylpropylamine are admixed with 10 kg. of polyethylene in the rolling mill and the thus-obtained rough sheet was granulated. Plates were then produced from the resulting particles by both pressing and injection molding and the static propensity of the plates was evaluated by rubbing with a wool cloth. The plates were found to attract only minute amounts of dust.

EXAMPLE 5

150 g. nonylcyclohexyloxypropyl-$\beta$-hydroxyethylamine are mixed in a high-speed blender with 10 kg. of polybutene-(1) and the resulting mixture is compressed on the rolling mill. The thus-obtained rough sheet is granulated and both pressed plates and injection molded parts are produced therefrom. The antistatic effectiveness thereof was tested by rubbing with a wool cloth. The plates and molded parts treated in this manner attract only very small amounts of dust.

EXAMPLE 6

200 g. of the addition product of phenyloxypropylamine and 5 g.-mols propylene oxide are mixed with 10 kg. of polypropylene; the thus-obtained mixture is granulated, and injection molded plates are produced from the granulate. After rubbing with a wool cloth, the plates attract only minor amounts of dust.

EXAMPLE 7

100 g. of the addition product of $C_{12}$–$C_{18}$-alkyloxypropylamine and 2 g.-mols ethylene oxide are dissolved in 1.5 liter of acetone; the solution is mixed under stirring with 10 kg. of polyethylene, and the solvent is evaporated. From the remaining granulate, pressed plates and injection molded parts are produced. The effect of the antistat on these plates is tested by rubbing with a wool cloth. The treated polyethylene attracted no dust at all, while similar articles of pure polyethylene exhibit a strong dust attraction.

EXAMPLE 8

90 g. of the addition product of 12 g.-mols propylene oxide and oleylphenyloxypropylamine are homogenized in a high speed mixer with 5 kg. of polypropylene. From the resulting granulate, pressed plates and injection molded plates are produced. The plates thus produced exhibited a definite reduction in the accumulation of static charges.

After extended periods of storage several measurements of the surface resistance of polyolefins treated with the antistats of the present invention were made to determine what, if any loss of antistatic protection occurred by aging. The results of these aging tests, together with the values of the surface resistivity obtained immediately after the articles were produced are shown in Examples 9 to 12, 15 to 17, and 20 to 23, of Table 1. Further, Examples 13, 14, 18, 19 and 24 show the surface resistance (measured during corresponding periods of storage) of several polyolefins treated with the prior art antistatic agents.

From the results shown in Table 1, it can be seen that treatment of polyolefins with the antistats of this invention provides a considerable improvement over conventional antistatic agents with respect to the surface resistance and/or the permanence of the antistatic effectiveness.

TABLE I

| Example | Polyolefin | N-hydroxyethylate residue | Number of hydroxyethylene units* | Surface resistance [megohm] at 40% atmospheric humidity and 22° C. with the addition of 2 parts per 100 parts of polyolefin | | | Remarks, Antistatic effectiveness |
|---|---|---|---|---|---|---|---|
| | | | | Measured immediately after producing the pressed plate | Measured about 4 months later | Measured about 1 year later | |
| 9 | Polyethylene | Ethylhexyloxypropylamine. | 3 | $8 \cdot 10^2$ | $3 \cdot 10^3$ | $5 \cdot 10^3$ | Very good. |
| | | | 10 | $4 \cdot 10^4$ | $7 \cdot 10^4$ | $9 \cdot 10^4$ | Medium. |
| 10 | | n-Decyloxypropyl-amine. | 5 | $8 \cdot 10^2$ | $2 \cdot 10^3$ | $3 \cdot 10^3$ | Very good. |
| | | | 15 | $8 \cdot 10^3$ | $1 \cdot 10^4$ | $5 \cdot 10^4$ | Good. |
| 11 | | n-Dodecyloxypropylamine. | 2 | $8 \cdot 10^1$ | $1 \cdot 10^2$ | $3 \cdot 10^2$ | Excellent. |
| | | | 5 | $5 \cdot 10^3$ | $8 \cdot 10^3$ | $1 \cdot 10^4$ | Good. |
| 12 | | n-Octadecyloxypropylamine. | 2 | $4 \cdot 10^2$ | $6 \cdot 10^3$ | $9 \cdot 10^2$ | Very good. |
| | | | 5 | $2 \cdot 10^4$ | $4 \cdot 10^4$ | $5 \cdot 10^4$ | Medium. |
| 13 | | For comparison: n-Dodecanol. | 2 | $2 \cdot 10^6$ | $6 \cdot 10^6$ | $>\cdot 10^7$ | Very bad. |
| | | | 5 | $5 \cdot 10^5$ | $8 \cdot 10^5$ | $6 \cdot 10^6$ | Bad. |
| 14 | | For comparison: n-Hexadecylamine. | 2 | $1 \cdot 10^4$ | $5 \cdot 10^4$ | $1 \cdot 10^5$ | Medium. |
| 15 | Polypropylene | n-Dodecyloxypropylamine. | 2 | $2 \cdot 10^2$ | $4 \cdot 10^2$ | $5 \cdot 10^2$ | Very Good. |
| | | | 5 | $3 \cdot 10^3$ | $7 \cdot 10^3$ | $7 \cdot 10^3$ | Good. |
| 16 | | n-Hexadecyloxypropylamine. | 2 | $8 \cdot 10^3$ | $9 \cdot 10^3$ | $9 \cdot 10^3$ | Do. |
| | | | 6 | $7 \cdot 10^4$ | $9 \cdot 10^4$ | $2 \cdot 10^5$ | Medium. |
| 17 | | Oleyloxypropylamine. | 4 | $9 \cdot 10^2$ | $4 \cdot 10^3$ | $9 \cdot 10^3$ | Very good. |
| | | | 12 | $3 \cdot 10^4$ | $3 \cdot 10^4$ | $1 \cdot 10^5$ | Medium. |
| 18 | | For comparison: n-Dodecanol. | 2 | $2 \cdot 10^6$ | $3 \cdot 10^6$ | $6 \cdot 10^6$ | Very bad. |
| | | | 5 | $3 \cdot 10^5$ | $4 \cdot 10^5$ | $8 \cdot 10^5$ | Bad. |
| 19 | | For comparison: n-Octadecylamine. | 2 | $8 \cdot 10^4$ | $1 \cdot 10^5$ | $3 \cdot 10^5$ | Medium. |
| | | | 12 | $3 \cdot 10^4$ | $5 \cdot 10^4$ | $9 \cdot 10^4$ | Do. |
| 20 | Polybutene-(1) | 2-ethylhexyloxypropylamine. | 2 | $3 \cdot 10^3$ | $1 \cdot 10^4$ | $5 \cdot 10^4$ | Good. |
| 21 | | i-Nonyloxypropyl-amine. | 5 | $1 \cdot 10^4$ | $3 \cdot 10^4$ | $3 \cdot 10^4$ | Medium. |
| 22 | | n-Dodecyloxypropylamine. | 2 | $2 \cdot 10^2$ | $3 \cdot 10^2$ | $5 \cdot 10^2$ | Very good. |
| | | | 6 | $2 \cdot 10^3$ | $5 \cdot 10^3$ | $7 \cdot 10^3$ | Good. |
| | | | 15 | $8 \cdot 10^4$ | $1 \cdot 10^5$ | $5 \cdot 10^5$ | Medium. |
| 23 | | n-Tetradecyloxypropylamine. | 2 | $2 \cdot 10^3$ | $4 \cdot 10^3$ | $5 \cdot 10^3$ | Good. |
| 24 | | For comparison: n-Dodecanol. | 2 | $1 \cdot 10^5$ | $2 \cdot 10^6$ | $5 \cdot 10^6$ | Very bad. |
| | | | 6 | $4 \cdot 10^4$ | $7 \cdot 10^4$ | $8 \cdot 10^4$ | Medium. |
| | | | 15 | $3 \cdot 10^4$ | $5 \cdot 10^4$ | $8 \cdot 10^4$ | Do |

*The oxyalkylene residuals are distributed between and replace the two hydrogen atoms of the amino-nitrogen atoms.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An antistatic composition comprising a normally solid polyolefin having uniformly and intimately distributed therein from 0.1 to 4.0% by weight of a hydroxyethylated alkoxypropylamine of the formula

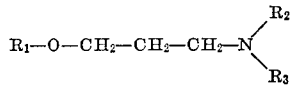

wherein
R₁ represents an alkyl, alkenyl, alkylcycloalkyl, aryl, alkylary, or alkenylaryl group of 6–25 chain carbon atoms in the alkyl or alkenyl moiety, and 4 to 18 carbon atoms in the cycloalkyl, the aromatic moiety of the aryl, alkylaryl, and alkenylaryl moiety having 1 to 3 rings containing 0 to 4 carbon atoms coupled by fused rings;
R₂ and R₃ represent a residue $(C_xH_{2x}O)_nH$,
$x$ being 2 or 3,
$n$ being 1 to 10 and
wherein R₃ can also represent a hydrogen atom.

2. The antistatic composition of claim 1 wherein said polyolefin is selected from the group consisting of polyethylene, polypropylene, polybutene-1, poly-4-methylpentene-1, and the hydroxyethylated alkoxypropylamine constitutes from 0.3 to 1.5% by weight of the composition.

3. The composition of claim 1 wherein the polyolefin is selected from the group consisting of high- and low-pressure polyethylenes having molecular weights between 10,000 and 1,000,000, polypropylenes having molecular weights between 50,000 and 800,000, polybutenes-1 having molecular weights between 200,000 and 5,000,000, and poly-4-methyl-pentenes-1 having molecular weights between 200,000 to 1,000,000.

4. The composition of claim 1 wherein the polyolefin resin is selected from the group consisting of high- and low-pressure polyethylenes having molecular weights between 10,000 and 1,000,000, polypropylenes having molecular weight between 50,000 and 800,000, polybutenes-1 having molecular weights between 200,000 and 5,000,000, and poly-4-methyl-pentenes-1 having molecular weights between 200,000 and 1,000,000.

5. The composition defined by claim 1 wherein the polyolefin is selected from the group consisting of a copolymer of 99.9 to 0.1% by weight of ethylene, and 0.1 to 99.9% by weight of propylene; 99.9 to 0.1% by weight of ethylene, and 0.1 to 99.9% by weight of butene-1; 99.9 to 0.1% by weight of ethylene and 99.9 to 0.1% by weight of propylene and butene-1, the latter components being present in any proportion; and 99.9 to 0.1% by weight of propylene and 99.9 to 0.1% by weight of butene-1 and penetene-1, the latter components being present in any proportion.

6. A shaped object comprising a polyolefin having uniformly and intimately distributed therein from 0.01 to 4% by weight of at least one compound of the formula

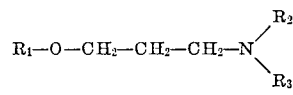

wherein
R₁ represents an alkyl, alkenyl, alkylcycloalkyl, aryl, alkylaryl, or alkenylaryl group of 6–25 chain carbon atoms in the alkyl or alkenyl moiety, and 4 to 18 carbon atoms in the cycloalkyl, the aromatic moiety of the aryl, alkylaryl, and alkenylaryl moiety having 1 to 3 rings containing 0 to 4 carbon atoms coupled by fused rings;
R₂ and R₃ represent a residue $(C_xH_{2x}O)_nH$, x being 2 or 3,
n being 1 to 10, and
wherein $R_3$ can also represent a hydrogen atom.

7. The shaped object of claim 6 comprising a polyolefin resin containing 0.3 to 1.5% by weight of at least one antistatic agent of the formula:

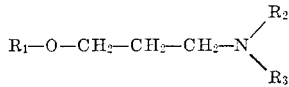

wherein
$R_1$ represents an alkyl, alkenyl, alkylcycloalkyl, aryl, alkylaryl, or alkenylaryl group of 6 to 25 chain carbon atoms in the alkyl or alkenyl moiety and 4 to 18 carbon atoms in the cycloalkyl, the aromatic moiety of the aryl, alkaryl or alkenylaryl moiety having 1 to 3 rings containing 0 to 4 carbon atoms coupled by fused rings
$R_2$ and $R_3$ represent a residue $(C_xH_{2x}O)_nH$, x being 2 and 3, or n being 1 to 3,
and wherein $R_3$ can also represent a hydrogen atom.

8. An antistatic composition as defined by claim 1 wherein $R_1$ is n-dodecyl.

9. An antistatic composition as defined by claim 1 wherein $R_1$ is n-dodecyl and both $R_2$ and $R_3$ represent hydroxyethyl.

10. A shaped object as defined by claim 6 wherein $R_1$ is n-dodecyl.

11. A shaped object as defined by claim 6 wherein $R_1$ is n-dodecyl and both $R_2$ and $R_3$ represent hydroxyethyl.

12. An antistatic composition as defined by claim 1 wherein $R_1$ is alkyl or alkenyl.

13. A shaped object as defined by claim 6 wherein $R_1$ is alkyl or alkenyl.

References Cited

UNITED STATES PATENTS 3,365,435   1/1968   Adams et al. _____ 260—93.7

FOREIGN PATENTS 820,541   9/1959   Great Britain.

JOSEPH L. SCHOFER, Primary Examiner

STANFORD M. LEVIN, Assistant Examiner

U.S. Cl. X.R.

260—88.2, 93.7, 94.9, 874